United States Patent Office 3,181,117
Patented Apr. 27, 1965

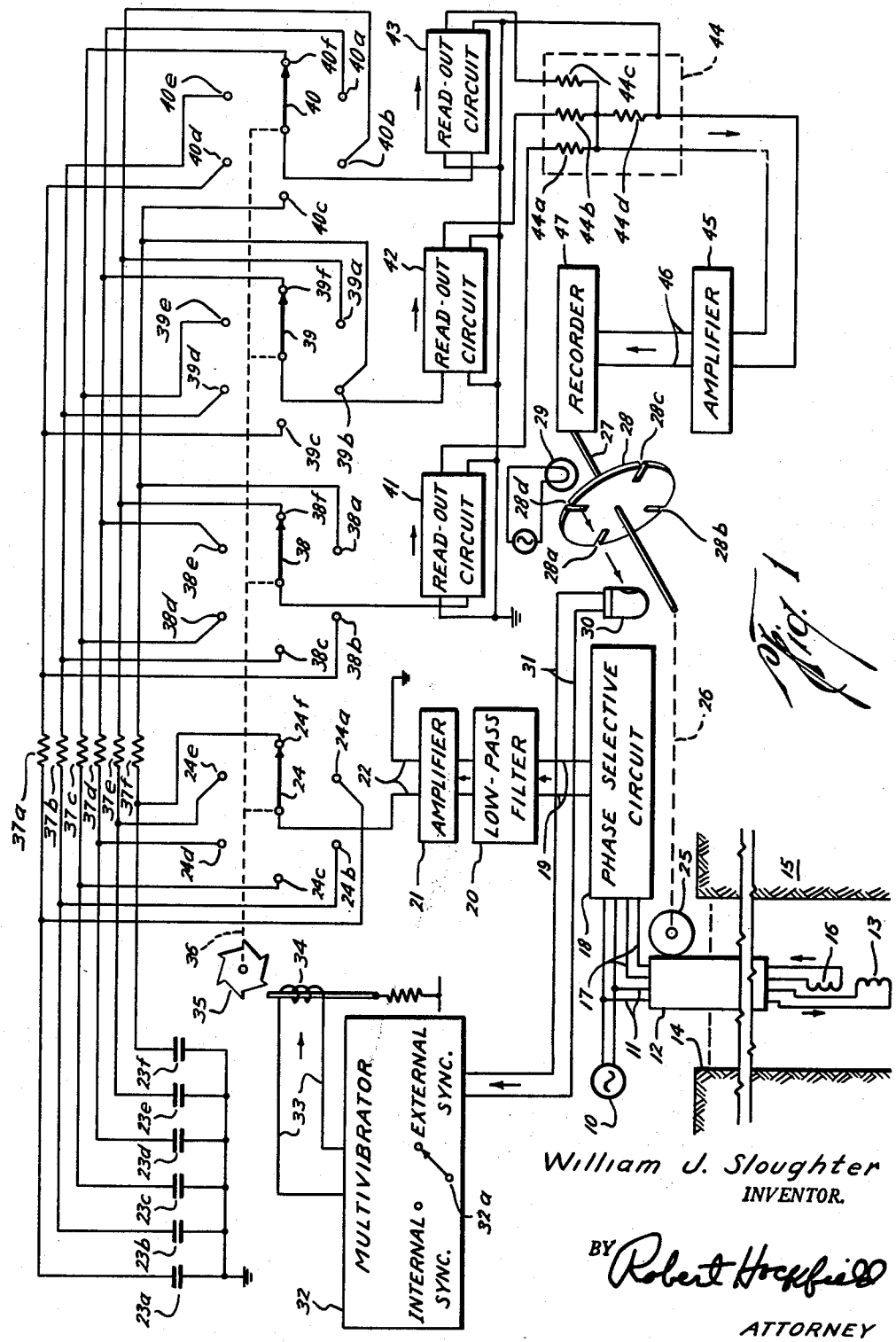

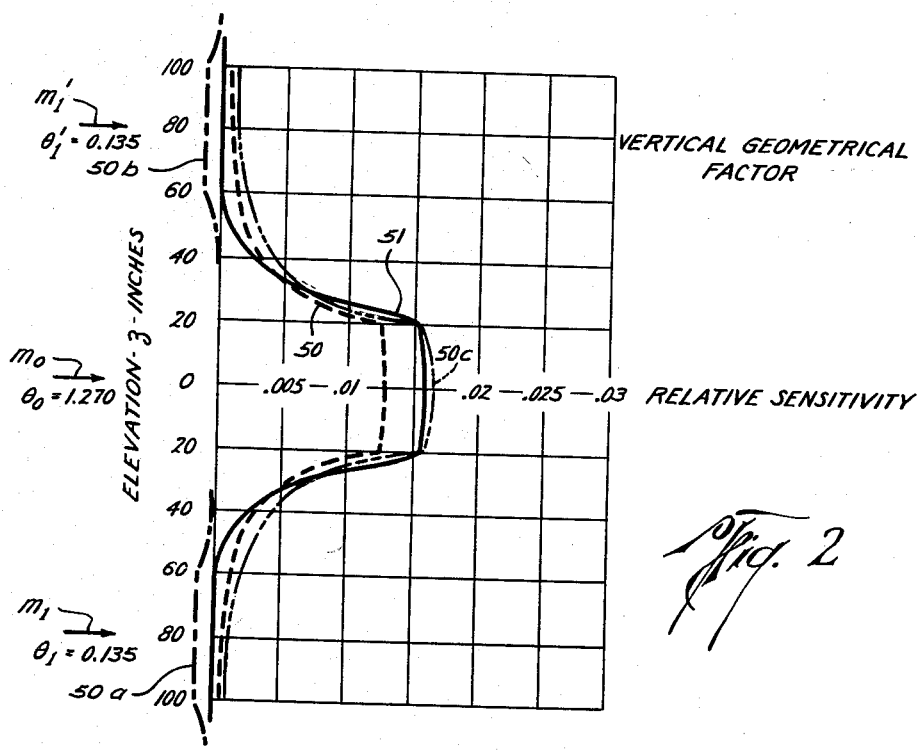
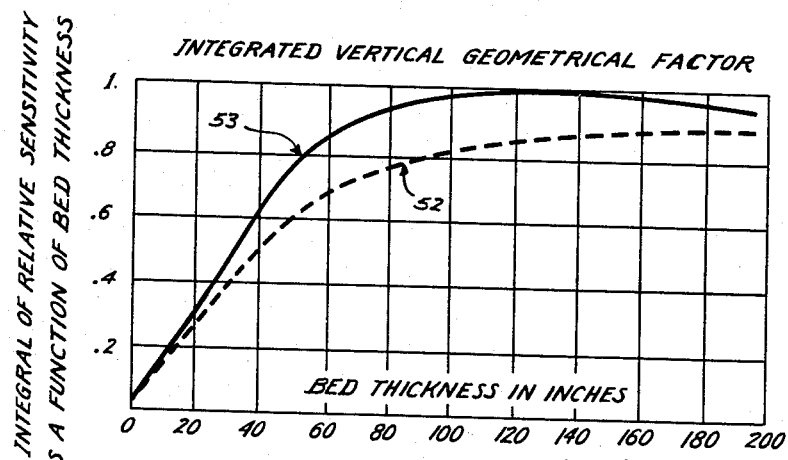

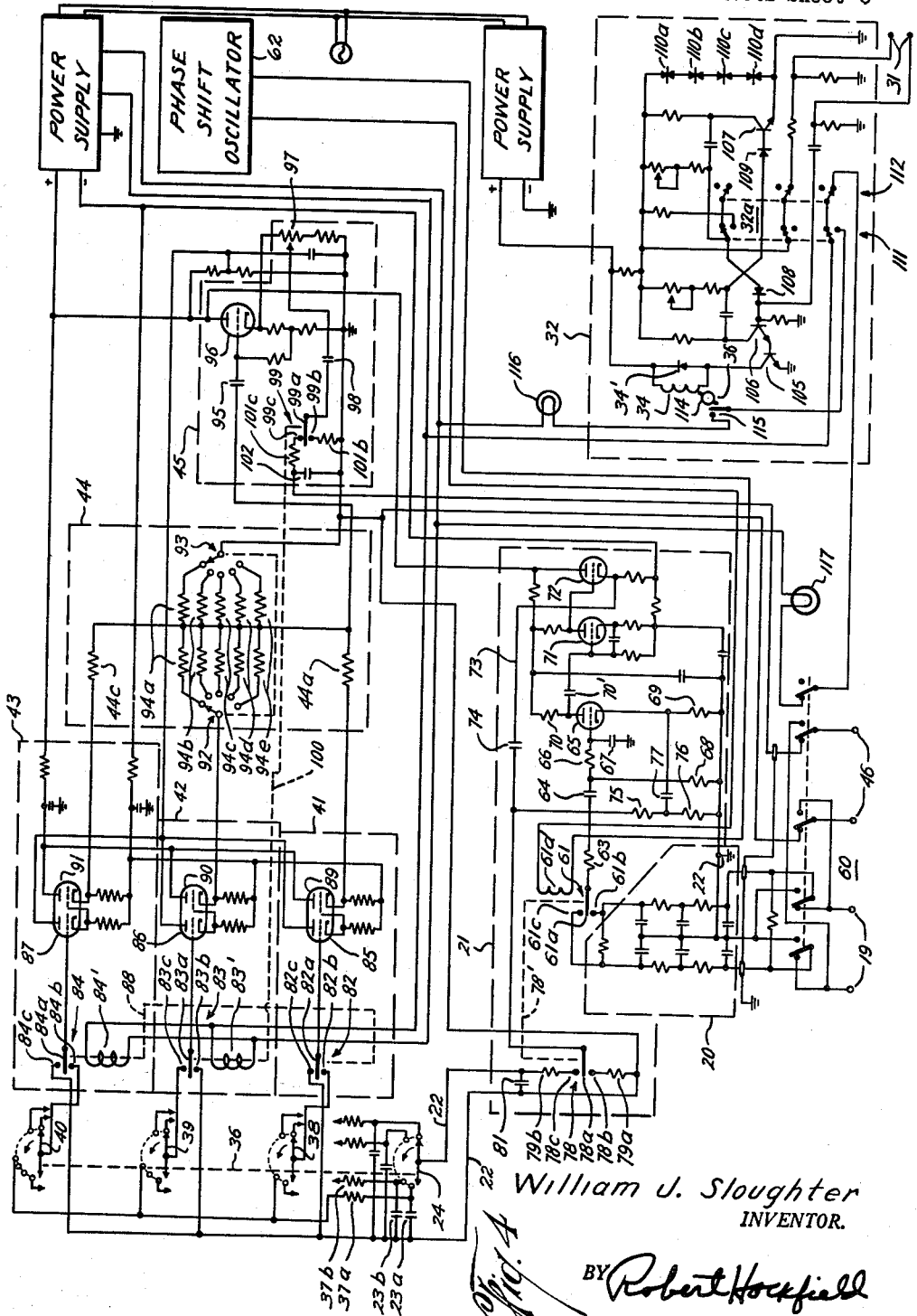

3,181,117
SIGNAL PROCESSING SYSTEMS
William J. Sloughter, Houston, Tex., assignor to Schlumberger Well Surveying Corporation, Houston, Tex., a corporation of Texas
Filed Apr. 17, 1959, Ser. No. 807,213
10 Claims. (Cl. 340—18)

This invention relates to electrical signal processing and, more particularly, pertains to a new and improved signal processing system useful in connection with apparatus for electromagnetically investigating earth formations traversed by a borehole. Such apparatus is usually comprised of a coil system adapted to be lowered into the borehole to derive a signal representing an electrical characteristic of the earth formations, for example, its electrical conductivity, and a recorder provides a continuous log of the conductivity signal as a function of depth.

In copending application Serial No. 807,221 of H. G. Doll filed April 17, 1959 and assigned to the same assignee as the present application, new methods and apparatus for electromagnetically exploring earth formations are disclosed and claimed which, among other attributes, feature greater vertical resolution for a given coil system than otherwise possible. Briefly stated, in accordance with that invention, an alternating-current-energized coil system is passed through a borehole and signals corresponding to a plurality of longitudinally-spaced stations are obtained. These signals are effectively combined in a predetermined manner to provide an information signal that is supplied to the usual indicator or recorder. By utilizing stations at selected locations and by properly weighting the signals prior to their being combined, highly useful and improved logs are achieved.

Since the signals corresponding to the several stations are obtained in time sequence as the coil system moves through the borehole, it is necessary to store or memorize them in order that they may be combined simultaneously. Of course, for effective and accurate operation, the information value of these signals must be maintained at least until they are utilized.

It is, therefore, an object of the present invention to provide a new and improved signal processing system capable of storing a plurality of information signals so that they may be subsequently utilized without experiencing any significant change in information value.

Another object of the present invention is to provide a new and improved signal processing system which is simple and relatively inexpensive to construct and yet is entirely efficient and reliable in operation.

A signal processing system embodying the present invention is especially useful in connection with apparatus for investigating earth formations traversed by a borehole utilizing exploring means adapted to be lowered into the borehole for providing a signal representing, for example, an electrical characteristic of the earth formations. The signal processing system comprises signal translating means adapted to be supplied with the aforesaid signal to provide a replica thereof at an output circuit of relatively low impedance, a plurality of storage capacitors, and switch means adapted to respond to movement of the exploring means through the borehole for coupling the output circuit to successive ones of the storage capacitors and for subsequently establishing at least two independent coupling circuits with successive ones of the storage capacitors. The signal processing system further comprises electrical circuit means connected to the coupling circuits for combining the electrical signals from the coupling circuits to provide a processed signal. Means may be employed for deriving indications in response to the processed signal.

The novel features of the present invention are set forth with particularity in the appended claims. The present invention, both as to its organization and manner of operation, together with further objects and advantages thereof, may best be understood by reference to the following description taken in connection with the accompanying drawings in which:

FIG. 1 is a schematic diagram, partly in block form, of a signal processing system embodying the present invention shown in operative relation with electromagnetic apparatus for investigating earth formations traversed by a borehole;

FIGS. 2 and 3 are response curves for the apparatus of FIG. 1 useful in explaining the operation thereof;

FIG. 4 is a detailed circuit diagram of a portion of the apparatus illustrated in FIG. 1.

In the lower left-hand side of FIG. 1 of the drawings is shown a source of alternating potential 10 connected by conductors 11 of an armored electric cable 12 to a transmitter coil 13 supported by the cable 12 in a borehole 14 which traverses earth formations 15. Spaced longitudinally from transmitter coil 13 is a receiver coil 16 connected by conductors 17 of cable 12 to a phase selective circuit 18 which is also connected to source 10. The electromagnetic means or coil system 13, 16 may be of the two-coil type described in an article by H. G. Doll entitled "Introduction to Induction Logging and Application to Logging of Wells Drilled With Oil Base Mud" published in the Petroleum Transactions of the AIME in June of 1949. As there described, coil system 13, 16 provides a signal at leads 17 proportional to the conductivity of the earth formations 15. Phase selective circuit 18 may be of a type such as disclosed in Patent No. 2,788,483 of H. G. Doll which selects from the applied signal only that component representing conductivity to the exclusion of other signal components (i.e., susceptibility signal components), utilizing the signal from source 10 as a phase reference. Thus, the signal which appears at output terminals 19 of circuit 18 accurately represents conductivity of earth formations 15. The coil system 13, 16 is lowered and raised in the borehole 14 by means of a winch (not shown) in the usual manner and thus by recording the signal at terminals 19 as a function of depth, a continuous log of earth formation conductivity may be obtained in a known manner.

To process the signal at terminals 19 in accordance with the teachings of the aforementioned Doll application, terminals 19 are connected to a low-pass filter 20 designed to exclude high frequency components which could not be effectively translated by a sequential switching system to be described later. Filter 20 is connected to an amplifier 21 which provides a replica of the input signal across an output circuit 22 of relatively low impedance.

To supply the signal from circuit 22 sequentially to a plurality of storage capacitors 23a–23f in response to movement of electromagnetic means 13, 16 through the borehole 14, the apparatus includes switch means in the form of a rotatable switch comprised of a movable contact arm 24 adapted to travel along and to engage successively a plurality of fixed contacts 24a–24f connected to respective ones of the storage capacitors 23a–23f.

Arm 24 is displaced in synchronism with travel of electromagnetic means 13, 16 by a means of a measuring wheel 25, arranged to be driven by cable 12 in a known manner, and a linkage, schematically represented by broken line 26 in association with an electromechanical driving system. The driving system includes a disc 28 mounted for rotation with a shaft 27 that is rotated by wheel 25 through linkage 26. Cut into the disc are a plurality of slots 28a–28d so that as the disc rotates, light from a source 29 is modulated into pulses before impinging on a photoelectrical device 30 which may, for example, be a phototransistor. Thus, pulses are developed at output terminals 31 of the phototransistor having a time distribution that is synchronous with movement of cable 12 through the borehole 14. Terminals 31 are connected to the input circuit of a multivibrator 32 provided with a switch 32a so as to be internally or externally synchronized at the option of an operator. In the external synchronization position of switch 32a, the pulses at terminals 31 control the operation of the multivibrator which, in turn, supplies corresponding pulses over leads 33 to a coil 34 of an electromagnetic actuator 35 mechanically connected by a linkage, schematically represented by broken line 36, to switch arm 24.

In order to establish a plurality of independent coupling circuits with successive ones of the storage capacitors 23a–23f, the capacitors are connected by individual isolating resistors 37a–37f to fixed contacts of a plurality of switches having rotatable contact arms 38, 39 and 40. In the arrangement illustrated in FIG. 1, movable contacts 24, 38, 39 and 40 are included in respective decks of a conventional rotary stepping switch. These decks are parallel to one another and a common shaft corresponding to linkage 36 connects the actuator 35 to all of the movable arms. The movable arms are longitudinally alinged and thus in order to derive a plurality of signals corresponding to different stations in the borehole 14, the capacitors 23a–23f are connected through their isolating resistors 37a–37f to appropriate fixed contacts of the switches including arms 38, 39 and 40. For example, capacitor 23a is connected by resistor 37a to contact 38b of the switch containing arm 38, to contact 39c of the switch containing arm 39 and to contact 40d of the switch containing arm 40. The remaining connections are arranged in a similar manner. Of course, if desired, the fixed contacts may be connected symmetrically and the arms 38, 39 and 40 may be displaced relative to one another and to arm 24 to provide the required station selection.

The coupling circuits established by switch arms 38, 39 and 40 are connected to individual read-out circuits 41, 42 and 43. These read-out circuits have relatively high input impedances so as to minimize discharge of the storage capacitors 23a–23f. As shown, the input connections to read-out circuits 41 and 43 are alike but of opposite polarity to that of read-out circuit 42 to provide a desired signal combination. The read-out circuits 41–43 are connected to a weighting and combining circuit 44 comprised of resistors 44a, 44b, and 44c, each connected in series with one output lead of a corresponding read-out circuit and to a common resistor 44d. Resistor 44d is connected to the input circuit of an amplifier 45 and thus an amplified replica of the processed signal that appears at resistor 44d is developed at output terminals 46. Terminals 46 are connected to a conventional recorder 47 having a recording medium driven by shaft 27 so that a continuous log of the processed signal as a function of depth of the electromagnetic means 13, 16 is obtained.

As described earlier, the signal developed at terminals 19 constitutes a quantitative determination of the conductivity of earth formations 15. The vertical response characteristics for the portion of the apparatus providing the signal at terminals 19 is represented by the broken line curve 50 in FIG. 2. Curve 50 is a plot for a particular set of coils 13, 16 showing the relative contribution of different horizontal layers of ground of elemental vertical thickness as a function of the vertical distance from the center of the coil system 13, 16. As described in the aforementioned copending application of H. G. Doll, by combining the signals from a plurality of stations in a prescribed manner, a substantial improvement in the vertical investigation characteristic may be achieved. In other words, by reproducibly recording the induction log signal as a function of depth in the borehole and subsequently reproducing three signals simultaneously corresponding to three longitudinally spaced stations in the borehole, the latter may be combined after appropriate weighting factors are applied. The station locations and weighting factors may be determined in a manner presented in the Doll application. For example, a center station $m_0$ with weight $\theta_0 = 1.27$ and adjacent stations $m_1$ and $m_1'$ spaced 80″ below and above $m_0$ and having weights $\theta_1 = \theta_1' = 0.135$ may be used. In FIG. 2, while curve 50 represents the unweighted vertical investigation characteristics for the apparatus at station $m_0$, curves 50a and 50b represent the corresponding, weighted characteristics at stations $m_1$ and $m_1'$. Curve 50c represents curve 50 increased by the $m_0$ weighting factor $\theta_0$. Since the signals for stations $m_1$ and $m_1'$ are subtracted from the signal at $m_0$, the former are shown in opposite polarity sense relative to the latter. By graphically combining curves 50a, 50b and 50c, the resulting characteristics such as illustrated by the solid line curve 51 in FIG. 2 may be obtained for the particular selection of stations and weights. It is evident, that through signal processing in this manner, the vertical resolution of the apparatus is considerably improved. In addition, a comparison of curves 50 and 51 reveals that the apparatus has a reduced response to beds adjacent to a particular one whose conductivity is being measured.

This may also be seen by referring to FIG. 3 in which broken line curve 52 is a plot of relative response as a function of bed thickness for the portion of the apparatus providing a signal at terminals 19 for a particular set of coils 13, 16. By storing and combining signals in the manner just considered, a resulting characteristic as illustrated by solid line curve 53 is obtained. Curve 53 clearly shows that the apparatus is capable of more accurately denoting the conductivity of relatively thin beds. Furthermore, the lateral investigation characteristics are not impaired.

To process the signal at terminals 19 and thereby obtain this highly desirable result, as the coil system 13, 16 is displaced through borehole 14, for example, in an upwardly direction, measuring wheel 25 causes disc 28 to interrupt the light incident on photoelectric device 30 and the resulting pulses control multivibrator 32 which, in turn, operates stepping switch actuator 35. Consequently, the signal at leads 19, after attenuation of high frequency components and amplification, is supplied by means of arm 24 and the fixed contacts 24a–24f in sequence to the storage capacitors 23a–23f. Since amplifier 21 has a relatively low output impedance, each condenser is quickly brought to the proper charge potential. In other words, if a condenser is initially uncharged, because of the low impedance charging circuit, it is very quickly charged to the magnitude of the potential at leads 22. On the other hand, if a condenser has, as a consequence of a preceding charge condition, a higher charge value, the low impedance source causes that condenser to discharge quickly to the proper charge value. It is, therefore, apparent that the condensers have impressed thereon individual charge potentials representing the conductivity-representative signal derived at terminals 19 for successive longitudinally spaced locations along borehole 14.

It is assumed that a sufficient number of fixed contacts 24a–24f and corresponding storage capacitors are employed so that at normal logging speeds, the information signal does not change appreciably in amplitude between contacts. For example, one step, or contact, per five inches of borehole depth has been used successfully. Moreover, rapid changes in signal level caused by sharp conductivity contrasts or extraneous transients are eliminated by filter 20. Of course, if a higher degree of definition is desired the number of contacts and corresponding storage capacitors may be increased.

Simultaneously with movement of contact arm 24, movable arms 38, 39 and 40 effectively scan the capacitors 23a–23f in such a manner as to develop three signals representing three, longitudinally-spaced stations in the borehole 14. These signals or levels are supplied to read-out circuits 41, 42 and 43. If the signal at circuit 42 is assumed to be positive, by virtue of the input connections that are used, the signals supplied to circuits 41 and 43 are of negative plurality. Selected fractions of these signals are algebraically added or combined in circuit 44 and the resulting processed signal is supplied to amplifier 45 whose output signal is recorded by recorder 47 as a function of depth in the borehole.

Since circuit 44 is a passive, resistive network, obviously it cannot develop signals of greater amplitude than that of the applied signal. However, it is the relation of the weighting factors to one another that is significant and each of the several weights may be multiplied by a common apparatus constant K. For the illustrative example of $\theta_0=1.270$ and $\theta_1=\theta_1'=0.135$, K would have a value smaller than unity such that all of the weights become smaller than unity. Of course, the value of K is then taken into consideration by appropriate amplification of the signal at leads 46 or by appropriately calibrating the recorder 47.

As explained earlier, the overall characteristic of the apparatus including the signal processing system embodying the present invention is represented by curve 51 in FIG. 1 and by curve 53 in FIG. 3 thereby providing substantially improved overall performance. Moreover, by the use of highly reliable stepping switches and by providing a charging circuit for the storage condensers of relatively low impedance and read-out circuits of relatively high impedance, a high degree of reliability is afforded. In particular, the stored signals experience no significant change in amplitude values and thus effective, accurate operation is achieved.

Although only three computing stations are provided by the apparatus as described, obviously, additional decks on the stepping switch may be utilized to provide any desired number of stations. Of course, decks having a greater number of fixed contacts may be needed to accommodate such a change.

In FIG. 4, the portion of the apparatus extending between terminals 19 and terminals 46 is illustrated in detail. Terminals 19 and 46 are connected to a changeover switch 60 which may be utilized to bypass the signal processing system entirely thereby to provide a conventional log. Assuming that the switch 60 is in a condition making use of the processing system, terminals 19 are connected to the input side of filter 20 which may be of a conventional resistance-capacitance type arrangement to attenuate high frequency components while passing, with substantially no attenuation, signal components within a selected range of low frequencies. In order to relieve the design requirements on amplifier 21, its input circuit is provided with a vibrator or "chopper" 61 having a vibrating contact 61a arranged to complete circuits with fixed contacts 61b and 61c in alternation. Vibrating contact 61a is under the control of a coil 61d energized by an oscillator 62 which may be of any known type. For example, it may be a phase shift oscillator designed to operate at a frequency different from the frequency of the power source of the entire equipment. Thus, where the power frequency is 60 cycles per second, source 62 may conveniently be arranged to supply a chopper-actuating signal at 90 cycles per second.

Vibrating contact 61a is electrically connected via a current-limiting resistor 63 to a coupling condenser 64, in turn, connected through a resistor 66 to the control grid of a triode-type vacuum tube 65. The resistor 66 together with a shunt condenser 67 are utilized for parasitic oscillation suppression. A grid resistor 68 is connected from the junction of condenser 64 and resistor 66 to ground and tube 65 is provided with the usual cathode resistor 69 and anode resistor 70. Tube 65 thus operates as a signal amplifier. The anode of tube 65 is connected by a coupling condenser 70' to the grid circuit of a triode-type vacuum tube 71 connected to operate as a signal amplifier and the anode of tube 71 is directly connected to the control grid of another triode 72 connected to operate as a cathode follower. A lead 73 that extends from the cathode of tube 72 is connected via a coupling condenser 74 to a pair of resistors 75 and 76 which form a voltage divider. A selected portion of the signal supplied to the voltage divider is derived at the junction of the resistors and is fed by a coupling condenser 77 to the cathode of amplifier tube 65. Thus, by means of this degenerative feedback connection, gain stability and low output impedance are assured for the amplifier 21.

The signal which appears at leads 22 is an amplified version of the input signal at terminals 19. The signal as it is supplied to the input of amplifier 21, however, is interrupted at a frequency of 90 cycles per second by "chopper" contacts 61a–61c thus providing an undulating potential so that full D.C. amplification is not required of the amplifier 21. Consequently, the design requirements of amplifier 21 are much less stringent than would otherwise be necessary.

The junction between condenser 74 and resistor 75 is connected to a vibrating contact 78a which, as represented by broken line 78', is under the influence of coil 61d so that contacts 78a and 61a move in synchronism. Thus, by means of moving contact 78a and fixed contacts 78b and 78c synchronous rectification of the voltage at leads 22 is obtained. Fixed contacts 78b and 78c are connected through respective transient-suppressing resistors 79a and 79b and leads 22 to a common terminal for the storage capacitors 23a–23f and to movable arm 24. A filter and transient-suppressing condenser 81 is connected between leads 22. The several switches including the movable arms 24, 38, 39 and 40 are connected in the same manner illustrated in FIG. 1 and movable arms 38, 39 and 40 of the switches are connected to read-out circuits 41, 42 and 43, respectively.

In order to ease the signal-handling properties of the read-out circuits, their input circuits are provided with respective input "choppers" 82, 83 and 84. Vibrating contacts 82a, 83a, and 84a of the "choppers" are connected to respective control grids of triode tubes 85, 86 and 87 while fixed contacts 82b, 83c and 84b are connected to the switch arms 38, 39 and 40, respectively. The remaining fixed contacts 82c, 83b and 84c are connected to a common one of the leads or conductors 22, which common conductor may be connected to a suitable chassis ground point as indicated in the drawing. An energizing coil 83' is associated with vibrating contact 83a and is connected in parallel with an energizing coil 84' associated with vibrating contacts 84a and 82a (as indicated by broken line 88). The coils 83' and 84' are coupled to a source of alternating potential which may, for example, be a filament winding on one of the power supplies for the equipment and thus the moving contacts operate at a frequency of 60 cycles per second.

In an alternative design, stable D.C. amplifiers may be used thus eliminating the need for choppers 82, 83 and 84. In particular, a circuit of the type commonly referred to as a "cascode circuit" in which the vibrations in vacuum-tube characteristics are canceled by balancing one against another may be used.

Triodes 85, 86 and 87 are connected to operate as conventional cathode followers and to preserve relatively high input impedances, the cathode output circuit of each is directly connected to the grid circuit of one of respective electron tubes 89, 90 and 91, also connected as cathode followers. The cathodes of the cathode followers 89, 90 and 91 are coupled to the combining circuit 44.

Various of selected signal combinations may be provided by utilizing variable resistors for the resistors 44b and 44d. This may be accomplished, for example, by appropriate ganged switches 92 and 93 arranged to introduce, selectively, each of a group of pairs of resistors 94a–94e providing various ratios for the resistors 44b and 44d. The junction of all of the resistors 94a–94e is connected by a coupling condenser 95 in amplifier 45 to the control grid of a triode tube 96 connected as a cathode follower. In parallel with the cathode circuit of tube 96 is a potentiometer 97 used as a sensitivity control.

The movable contact of potentiometer 97 is connected by a coupling condenser 98 to a vibrating contact 99a of another "chopper" 99 like the ones described earlier. As represented by broken line 100, contact 99a moves in synchronism with contact 83a (as well as contacts 82a and 84a) so that synchronous rectification of the derived signal is achieved. Fixed contacts 99b and 99c of the "chopper" 99 are connected via transient-suppressing resistors 101b and 101c to the output terminals 46 and a transient-suppressing condenser 102 is connected between the output terminals.

Turning now to multivibrator 32, it is comprised of transistors 105, 106, 107 arranged in a conventional multivibrator circuit. Rectifiers 108 and 109 are included in a well-known manner to limit the amount of reverse base-to-emitter voltage which may develop and thus prevent break down. Series-connected diodes 110a–110d of the avalanche-type, commonly referred to as "Zener" diodes, are connected in parallel with the voltage supply to provide voltage stabilization. Another diode 34' is connected in shunt with the coil 34 to absorb voltage surges.

The switch 32a includes two separate sections 111 and 112 including several sets of contacts. When the movable contacts of switch section 111 are in their upper positions and the movable contacts of switch section 112 are in their lower positions, the multivibrator 32 is externally synchronized, i.e., it is triggered by the signal pulses at terminals 31. When the movable contacts of switch section 111 are in their lower positions, the multivibrator is internally synchronized, i.e., it self-oscillates and thus provides pulses continuously to coil 34. These pulses occur at a relatively fast repetition rate and serve to step the movable contacts 24, 38, 39 and 40 through their various positions very quickly. This action is employed to bring the storage condensers 23a–23f to reference potentials prior to a logging operation.

In order to obtain indications of the operation of the multivibrator during this resetting condition, a cam 114 coupled to the linkage 36 (FIG. 1) rotates with the switch arms and closes a pair of normally open contacts 115 twice per rotation. These contacts are in circuit with an indicator lamp 116 which is thus energized periodically so that the number of rotations of the switch arms 24, 38, 39 and 40 may be counted by the operator. After a predetermined number of rotations, the operator is assured that all of the storage condensers are at reference potentials and a logging operation may be initiated.

With the contacts of switch section 111 in their upper positions and with the contacts of switch section 112 in their upper positions, a similar type of operation may be carried out, but at a much lower rate. This is useful for test purposes.

Another indicator lamp 117 is associated with a pair of contacts in switch 60 so that the operator may be apprised of the condition making use of the signal processing system embodying the present invention.

The operation of the electrical circuit just described is generally similar to the operation of the apparatus described in connection with FIG. 1 and thus, a detailed explanation is deemed unnecessary.

Although vacuum tubes have been used for one part of the circuit and transistors for another, obviously, transistors could replace the vacuum tubes, with appropriate circuit changes, and vice versa.

While a particular embodiment of the present invention is shown and described, it is apparent that changes and modifications may be made without departing from this invention in its broader aspects and, therefore, the aim in the appended claims is to cover all such changes and modifications as fall within the true spirit and scope of this invention.

What is claimed is:

1. In apparatus for investigating earth formations traversed by a borehole utilizing exploring means adapted to be lowered into the borehole and providing an electrical signal representing a characteristic of the earth formations, a signal processing system comprising: signal translating circuit means having a low impedance output circuit and responsive to the aforesaid signal for developing across such output circuit a replica of said signal; a plurality of storage capacitors; switch means adapted to respond to movement of the exploring means through the borehole for coupling said output circuit to successive ones of said storage capacitors and for subsequently establishing at least two independent coupling circuits with successive ones of said storage capacitors; and electrical circuit means connected to said coupling circuits for combining electrical signals therein to provide a processed signal.

2. Apparatus according to claim 1 further comprising means interposed between said switch means and said electrical circuit means for periodically interrupting the signal derived in said two independent coupling circuits.

3. Apparatus according to claim 2 further comprising signal translating circuit means coupled to said electrical circuit means for providing a replica of said processed signal and rectifier means coupled to said last-mentioned signal translating means.

4. Apparatus according to claim 1 wherein said electrical circuit means includes a resistor in circuit with each of said independent coupling circuits and an additional resistor connected in common with said first-mentioned resistors to provide a signal representing the arithmetic sum of the applied signals.

5. Apparatus according to claim 1 wherein said switch means includes a plurality of single pole-multiposition switches, the movable contact of one of said switches being coupled to said signal translating means and the fixed contacts of said one switch being coupled to respective ones of said storage capacitors, the fixed contacts of the remaining switches being connected to respective ones of said storage capacitors, and the movable contacts of the remaining switches forming said independent coupling circuits.

6. Apparatus according to claim 5 further comprising means for deriving control pulses in response to movement of said exploring means through the borehole, said switch means including means for advancing said movable contacts in synchronism with said control pulses.

7. In apparatus for investigating earth formations traversed by a borehole utilizing exploring means adapted to be moved through the borehole and providing an electrical signal representing a characteristic of the earth formations, a signal processing system comprising: a plurality of storage capacitors; low impedance circuit means for applying the formation-representative signal to the storage capacitors one at a time in sequence; a plurality of high impedance circuit means for individually sampling the storage capacitors one at a time in sequence, these high impedance circuit means being constructed so that at any given instant each is sampling a different one of the storage capacitors; and circuit means coupled to the high impedance circuit means for combining the signal portions sampled at any given instant to provide a processed signal.

8. In apparatus for investigating earth formations traversed by a borehole utilizing exploring means adapted to be moved through the borehole and providing an electrical signal representing a characteristic of the earth formations, a signal processing system comprising: circuit means for supplying the formation-representative signal; circuit means for supplying a control signal representative of the movement of the exploring means through the borehole; a plurality of storage capacitors; low impedance circuit means responsive to the control signal for applying the formation-representative signal to the storage capacitors one at a time in sequence and in step with the movement of the exploring means through the borehole; a plurality of high impedance circuit means responsive to the control signal for individually sampling the storage capacitors one at a time in sequence in step with the movement of the exploring means through the borehole, these high impedance circuit means being constructed so that at any given instant each is sampling a different one of the storage capacitors; and circuit means coupled to the high impedance circuit means for combining the signal portions sampled at any given instant to provide a processed signal.

9. In apparatus for investigating earth formations traversed by a borehole utilizing exploring means adapted to be moved through the borehole and providing an electrical signal representing a characteristic of the earth formations, a signal processing system comprising: circuit means for supplying the formation-representative signal; amplifier circuit means having a low impedance output circuit and responsive to the formation-representative signal for reproducing such signal across the low impedance output circuit; a plurality of storage capacitors; a multi-position switch having a movable contact coupled to the low impedance output circuit and a plurality of fixed contacts coupled to different ones of the storage capacitors; a plurality of read-out circuit means each having a high impedance input circuit; a plurality of multi-position switches each having a movable contact coupled to one of the high impedance input circuits and a plurality of fixed contacts coupled to different ones of the storage capacitors, these switches being constructed so that at any given instant each high impedance input circuit is coupled to a different one of the storage capacitors; circuit means for supplying control pulses representative of the movement of the exploring means through the borehole; actuator means coupled to the movable switch contacts and responsive to the control pulses for advancing the movable contacts in synchronism with the movement of the exploring means through the borehole; and circuit means coupled to the read-out circuit means for combining the formation-representative signal portions supplied thereto to provide a processed signal.

10. In apparatus for investigating earth formations traversed by a borehole utilizing exploring means adapted to be moved through the borehole and providing an electrical signal representing a characteristic of the earth formations, a signal processing system comprising: circuit means for supplying the formation-representative signal; amplifier circuit means having a low impedance output circuit and responsive to the formation-representative signal for reproducing such signal across the low impedance output circuit; a plurality of storage capacitors; a multi-position switch having a movable contact coupled to the low impedance output circuit and a plurality of fixed contacts coupled to different ones of the storage capacitors; a plurality of read-out circuit means each having a high impedance input circuit; a plurality of multi-position switches each having a movable contact coupled to one of the high impedance input circuits and a plurality of fixed contacts coupled to different ones of the storage capacitors, these switches being constructed so that at any given instant each high impedance input circuit is coupled to a different one of the storage capacitors; circuit means for supplying control pulses representative of the movement of the exploring means through the borehole; actuator means coupled to the movable switch contacts and responsive to the control pulses for advancing the movable contacts in synchronism with the movement of the exploring means through the borehole; circuit means coupled to the read-out circuit means for combining the formation-representative signal portions supplied thereto to provide a processed signal; and a plurality of circuit interrupter means individually interposed between one of the read-out circuit high impedance input circuits and the movable switch contact coupled thereto for periodically interrupting the connections of the high impedance input circuits to the storage capacitors for further minimizing any loading on the storage capacitors.

References Cited in the file of this patent

UNITED STATES PATENTS

| | | |
|---|---|---|
| 2,275,736 | Cloud | Mar. 10, 1942 |
| 2,336,929 | Doyle | Dec. 14, 1943 |
| 2,842,852 | Tanguy | July 15, 1958 |